March 23, 1954 P. R. DOEG ET AL 2,673,316
DYNAMIC DUAL MOTOR DRIVE SAFETY TRACTION SHEAVE
Filed April 9, 1951 5 Sheets-Sheet 2
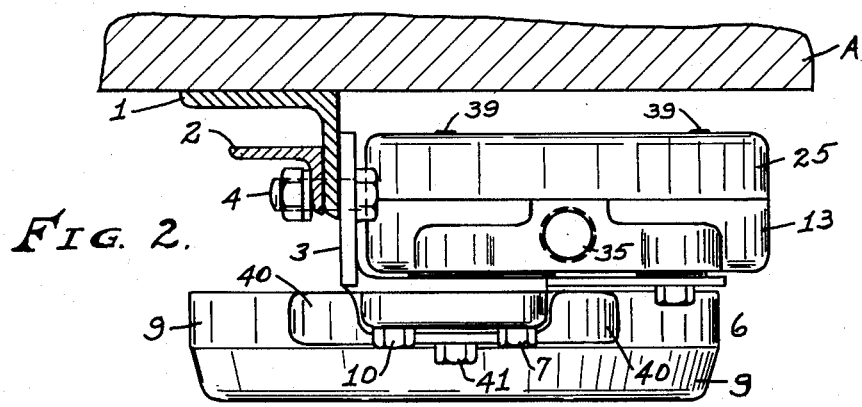
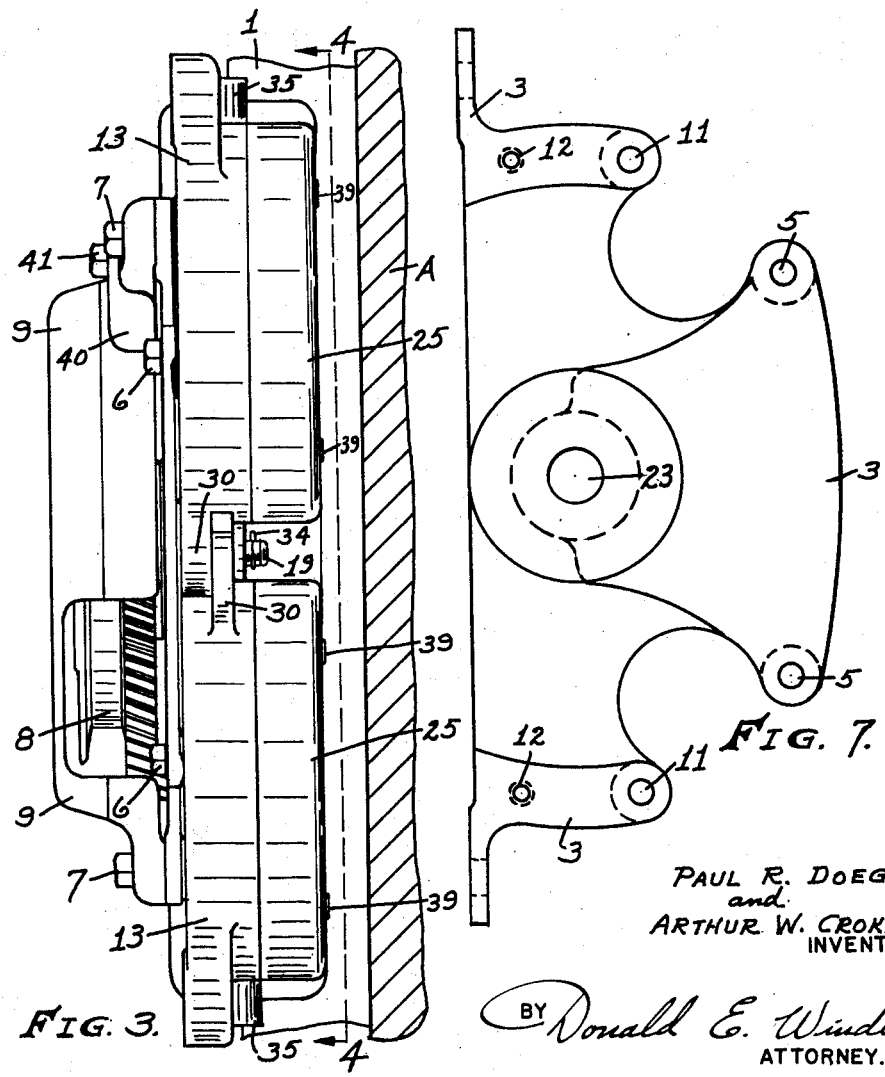
PAUL R. DOEG
and
ARTHUR W. CROKER,
INVENTORS.
BY Donald E. Windle.
ATTORNEY.

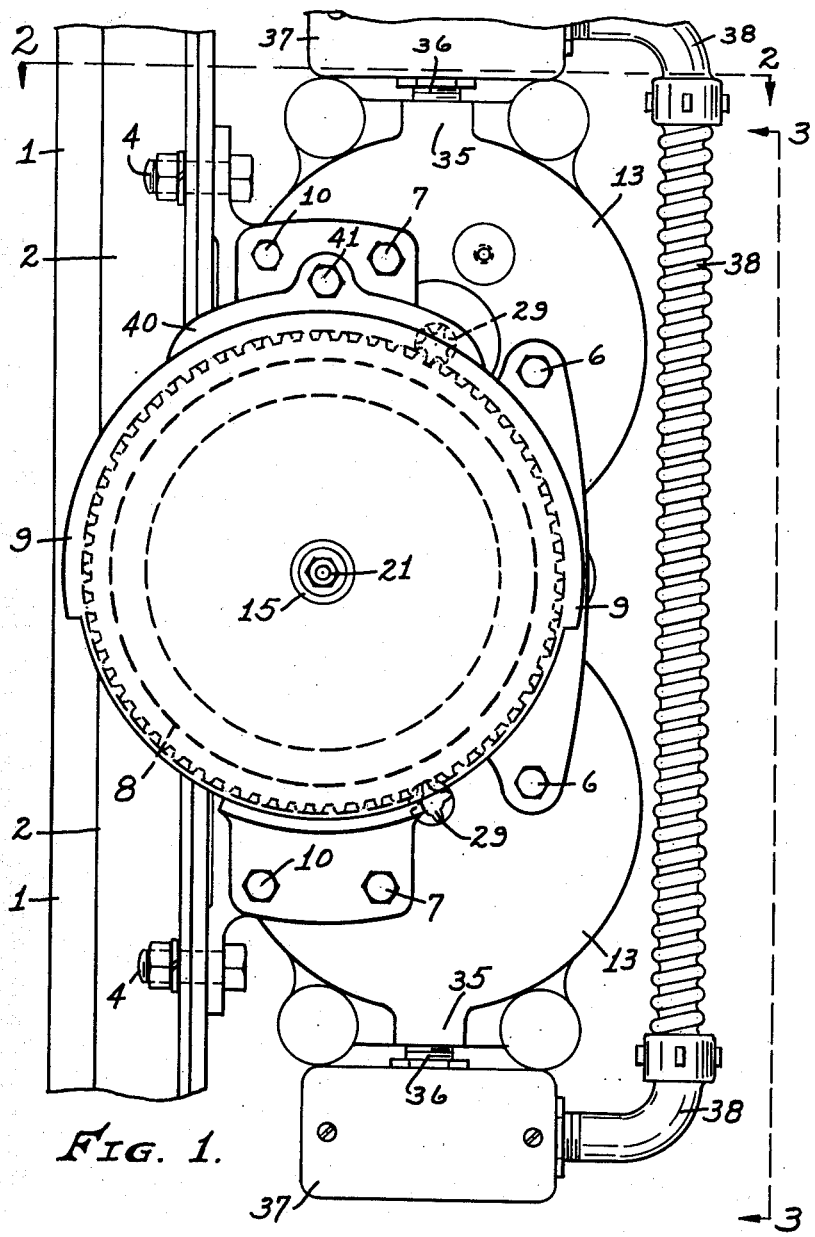

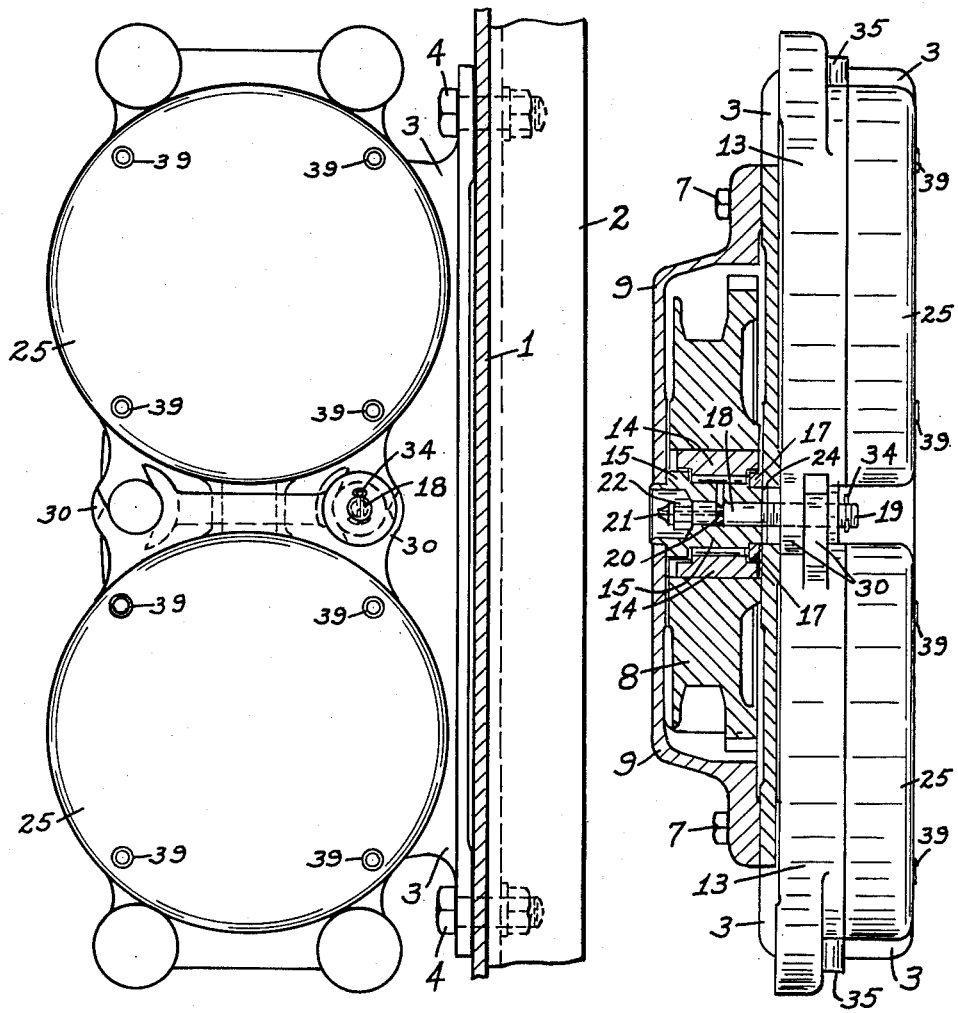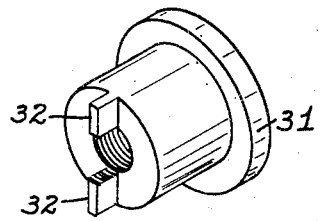

March 23, 1954 P. R. DOEG ET AL 2,673,316
DYNAMIC DUAL MOTOR DRIVE SAFETY TRACTION SHEAVE
Filed April 9, 1951 5 Sheets-Sheet 4

PAUL R. DOEG
and
ARTHUR W. CROKER,
INVENTORS.

BY Donald E. Windle.
ATTORNEY.

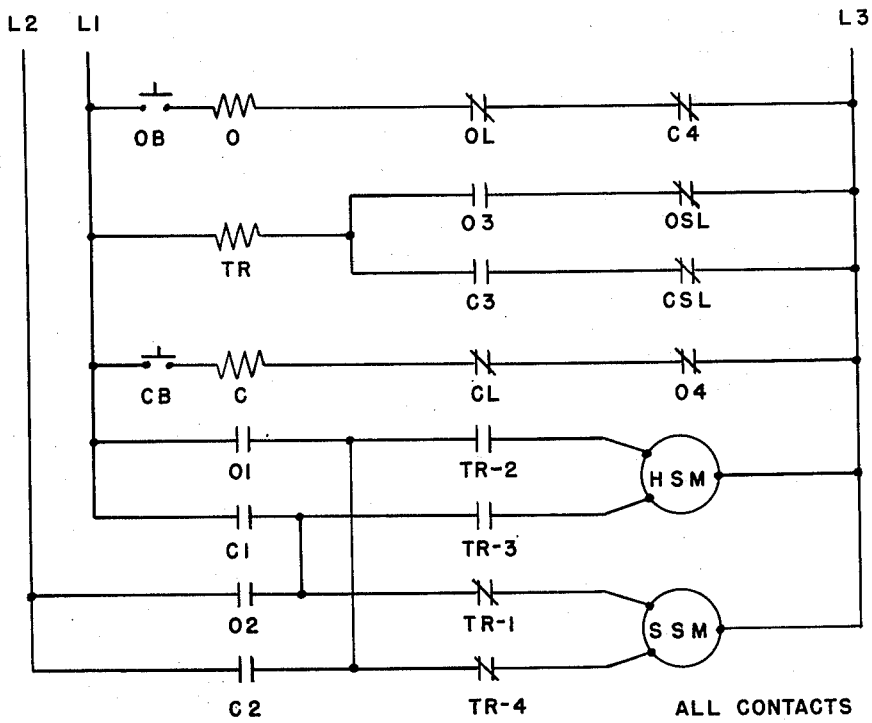

FIG. 12.

SYMBOLS
O- OPEN DIRECTION RELAY ON CONTROL PANEL
C- CLOSE DIRECTION RELAY ON CONTROL PANEL
TR- TRANSFER RELAY ON CONTROL PANEL
O1, O2, O3, O4 - CONTACTS ON OPEN RELAY
C1, C2, C3, C4 - CONTACTS ON CLOSE RELAY
TR1, TR-2, TR-3, TR-4 - CONTACTS ON TRANSFER RELAY
OB - OPEN DIRECTION PUSH BUTTON
CB - CLOSE DIRECTION PUSH BUTTON
OSL - OPEN DIRECTION SLOW DOWN LIMIT SWITCH ON DOOR RAIL
CSL - CLOSE DIRECTION SLOW DOWN LIMIT SWITCH ON DOOR RAIL
OL - OPEN DIRECTION FINAL LIMIT SWITCH ON DOOR RAIL
CL - CLOSE DIRECTION FINAL LIMIT SWITCH ON DOOR RAIL
HSM - HIGH SPEED DOOR MOTOR
SSM - SLOW SPEED DOOR MOTOR

ALL CONTACTS SHOWN WHEN NO PRESSURE IS APPLIED TO SWITCHES

PAUL R. DOEG and ARTHUR W. CROKER,
INVENTORS.
BY Donald E. Windle.
ATTORNEY.

Patented Mar. 23, 1954

2,673,316

UNITED STATES PATENT OFFICE 2,673,316

DYNAMIC DUAL MOTOR DRIVE SAFETY TRACTION SHEAVE

Paul R. Doeg, Lynbrook, and Arthur W. Croker, Valley Stream, N. Y., assignors to The Peelle Company, Brooklyn, N. Y.

Application April 9, 1951, Serial No. 219,926

7 Claims. (Cl. 318—46)

The present invention relates to operating means for freight elevator doors of the bi-parting counterbalanced type used particularly for closing elevator shaft openings. The doors to which the operating means are adapted are composed of vertically movable door sections, one section of which is adapted to cover the upper portion of an opening and sliding or moving upwardly between vertically-disposed guide members to to open while the companion section of the door is adapted to cover the lower portion of the opening and is adapted to move downwardly between vertically-disposed guide members in its opening movement. The vertically - disposed guide members are rigidly secured to the elevator side of the shaft walls and are located at each side of the opening. Flanges are provided in connection with the guides with guide shoes being secured to each vertical edge of each door section with the guide shoes operating over the flanges in the movements of the door sections upwardly and downwardly.

In order that the door sections operate simultaneously, one with the other, a sheave is provided on each of the guides and with each side of the upper door section having a flexible member secured thereto with the flexible members extending over the respective sheave and then downwardly where the lower end thereof is secured to the lower door section. Doors of the above-described types may be either manually operated or electrically operated. Electrically operated doors are usually provided with an electric motor connected either to the door sections or to the sheaves over which the flexible door-connecting members extend, there being means provided in the electrical control circuit for interrupting the circuit to the motors at predetermined positions of the moving door sections, and with the door sections coasting to their end travel either in opening or closing movements. In their movements, several uncontrollable variances enter into the coasting distance of the sections such as lubrication of the sheave members and the guide members. Should the members be well lubricated, the door sections have a tendency to overtravel the estimated coasting distance causing violent stoppage of the sections at the ends of their travel or, in case the members are underlubricated, the door sections have a tendency to lack sufficient momentum to carry them the full coasting distance. In the opening movements of the door sections, underlubrication prevents the sections from travelling their full coasting distance with the result being that the sections do not give full clear heights of the openings and it is necessary to manually operate the sections to their full length of travel. In the closing movements of the door sections, underlubrication of the members prevent the sections from coasting to their fully closed positions, with it being necessary to manually operate the sections to their fully closed positions. The doors are usually interlocked with the elevator operating circuit and it is necessary that the doors be in fully closed position before the elevator car can be moved from its position at the landing.

In order to overcome the objectionable features of the conventional electric operators, we have provided our dynamic dual drive traction sheave which not only provides means operating the door sections at high speed through a greater portion of their travel, but also provides means slowing the travel of the sections at a predetermined point near the end of their travel, and with the doors being operated at the slower speed to the end of their travel and thus eliminating the objectionable features of the conventional types of electric operating devices.

In view of the above, the principal object of the invention is the provision of a dual drive device which permits high speed operation of counterbalanced elevator door sections through substantially the full travel thereof but with the high speed operation being slowed near the end of travel and with the speed of travel being substantially slowed to the end of the travel.

A second object is the provision of a dual drive device composed of a pair of electric motors with each being in constant driving connection with a common traction sheave.

A third object is the provision of a two-speed driving mechanism adapted to be positioned within the limited space provided between the elevator car travel line and the surface of the adjacent shaft wall.

A further object is the provision of a pair of electric motors mounted on a common support with each of the motors being in constant driving connection with a common traction sheave, with either of the motors being capable of being removed from the common support without disturbing or displacing the other, and with the removal of either of the motors being accomplished from the shaft side thereof.

Further objects and particular advantages of the invention will become apparent in the course of the following description, and that which is new will be pointed out in the appended claims.

It will be noted that, due to the state of the art, the door structure is not shown in the drawings. The invention, as illustrated in the drawings and as described hereinafter, is adaptable to the conventional types of counterbalanced freight elevator doors, and it is not deemed necessary to include drawings of the doors.

The preferred and most satisfactory manner of carrying out the principles of the invention is shown in the accompanying drawings, in which:

Figure 1 is a shaft side elevational view of a right hand device shown as being secured in connection with elevator door guide rails and with an electrical conduit being shown in connection therewith.

Figure 2 is a top plan view of the device as taken from line 2—2 of Figure 1 but with the electrical conduit being omitted therefrom, and with the same being secured to door guide rails.

Figure 3 is a right side elevational detail of the device as taken from line 3—3 of Figure 1 but with the electrical conduit being omitted therefrom.

Figure 4 is a rear or shaft wall side elevation of the device, taken from line 4—4 of Figure 3.

Figure 5 is a combination vertical section and elevation of the device with a section being taken through the sheave member and with the motors thereof being shown in elevation.

Figure 6 is an isometric detail view of the internally threaded collar member provided in the assembly for removably securing the motors by means of the sheave bearing support shaft.

Figure 7 is a front elevational detail of the right hand sheave and motor mounting plate which is also provided with means for securing the same in connection with the door guide rails.

Figure 12 is a wiring diagram together with symbols showing the electrical circuit.

Like characters of reference designate like parts throughout the several views.

Figure 8:
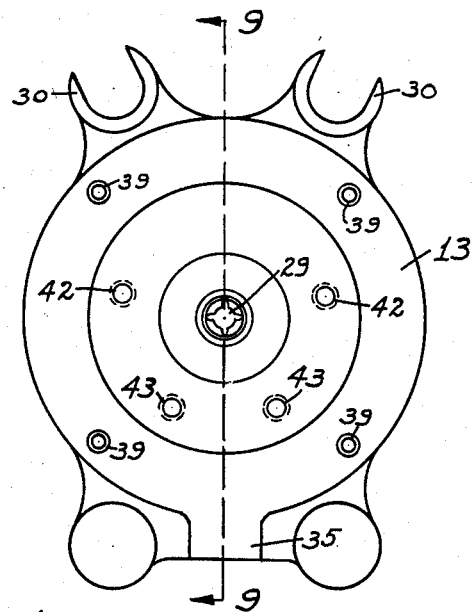
Figure 8 is a front elevation of the lower motor member with the same being shown detached from its mounting plate member.
Figure 9:
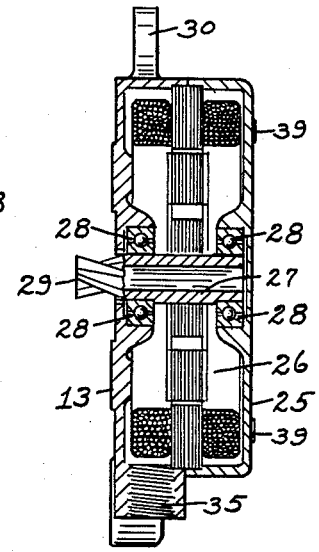
Figure 9 is a vertical section through the motor, as taken on line 9—9 of Figure 8.

In order that the construction, the operation, and the advantages of the invention may be more fully understood, we will now take up a detailed description thereof in which the same will be more fully set forth.

Referring now to the drawings in detail, numerals 1 designate the main rail member of the door track which is rigidly secured to the face of the elevator shaft wall A in any suitable manner. 2 designates a guide rail member which is secured to the main rail member and which is engaged by door guide shoes in the vertical movements of the door.

3 designates the sheave mounting plate which is adapted to be secured through the main rail and the guide rail members by means of bolts 4 or by other suitable means. A plurality of apertures 5 are formed through the mounting plate for the purpose of securing the motors thereto by means of threaded bolts 6 (shown in Figure 1). It will be noted that plate 3 is so designed that the same is reversible with respect to the door guides and like plates may be used either on the right or left guides.

A combined geared and grooved sheave 8 is mounted in the sheave housing 9 on the front or shaft side of plate 3 and with the housing 9 being secured to plate 3 by means of threaded bolts 7 and 10. It will be noted, by referring to Figures 1 and 7, that bolts 7 extend through the sheave housing and through holes 11 of plate 3, and are threaded into the front side of members 13 of the motor housings, while bolts 10 extend through the sheave housing 9 and thread directly into holes 12 of plate 3.

Figures 10, 11:
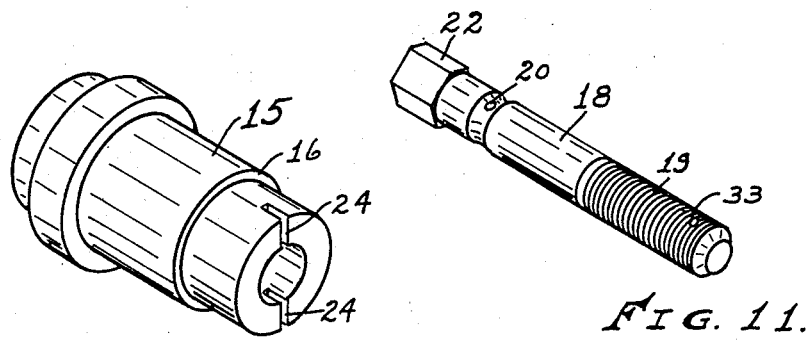
Figure 10 is an isometric detail of the sheave bearing shoulder member.
Figure 11 is an isometric detail view of the sheave bearing support shaft member.

Sheave member 8 is mounted on bearing 14 within housing 9 and with the bearing 14 being supported by means of sheave bearing support member 15 which has shoulder 16 formed thereon and which is adapted to bear against a ring member 17 of bearing 14, as more clearly shown in Figure 5. A bearing shaft 18 provides means securing the sheave in place. Shaft 18 has threads 19 formed on the rear end thereof and has a lubrication passage 20 formed in the forward end thereof and with a lubrication fitting 21 being provided in the forward end thereof. The outer end 22 of shaft 18 is formed for engagement with a wrench. Shaft 18 is adapted to extend through aperture or hole 23 of plate 3. It will be noted, by referring to Figures 5 and 10, that a slot 24 is cut across the rear end of bearing support member 15, the purpose of which will be set forth hereinafter.

Each of the motor housings is composed of a front portion 13 and a rear cap member 25 with the same having an electric motor secured therein with the motor being provided with a shaft 27 journalled in bearings 28. The forward end of shaft 27 has a pinion 29 secured thereon, with the pinion being adapted to engage the geared portion of sheave 8. A pair of open end lugs 30 are formed on each of the motor housing members 13 and with one of said lugs of each motor housing being adapted to align with shaft 18. It will be noted, by referring to Figures 3 and 5, that the lugs 30 of one housing member are offset with relation to lugs 30 of the other housing member 13. In order to secure the lug portions 30 to plate 3, we have provided collar member 31 which is internally threaded to receive the threaded portion 19 of shaft 18. It will be noted from Figure 6 that collar member 31 has extending lugs 32 formed on one end thereof and which are adapted to engage slots 24 of bearing support member 15. Threaded portion 19 of shaft 18 has an aperture 33 formed therethrough for the reception of cotter 34, the purpose of which will be set forth hereinafter.

Each of the motor housing members 13 has a threaded outlet 35 formed thereon with the same providing for the reception of a threaded conduit member 36 which is secured into a respective junction box 37. Conduit and fittings 38 serve to connect the junction boxes 37. Each of the junction boxes are connected with the control circuit of the motors.

Motor cap members 25 are secured in connection with housing members 13 by means of a plurality of hollow rivets 39.

An inspection cover plate 40 is secured, above sheave 8, to sheave housing member 9 by means of a screw 41.

In the assembly of each of the motors, the motor winding, together with the rotor and pinion are positioned in the housing 13, and with the cap member 25 being secured thereon by means of the hollow rivets 39. The object of riveting the housing members together is to prevent disassembly thereof at the job location, the intent being to have the motor returned to the factory for repair or reconditioning. After the motors are thus assembled, the same are then secured in their relative positions on plate 3 by means of bolts 6 being threaded into respective apertures 42 of housing members 13, and with the slots of the lugs 30 being in register with hole 23 of plate 3. Either of the motors may be the high speed motor with the other motor being of slower speed. No difference is affected in the operation of the device as to the relative locations of the high speed and slow speed motors.

The sheave assembly, comprising sheave 8, bearing 14, bearing support 15, and bearing shaft 18, is then placed in position on the forward face of plate 3 with the threaded end 19 of shaft 18 projecting rearwardly through hole 23 and in register with one slotted lug 30 of each of the motors. Collar member 31 is then inserted through the registering slotted lugs 30 and is drawn toward the rear end of bearing shaft support 15 by threading the bearing shaft thereinto. Lugs 32 are drawn into registering relation and enter slots 24 of member 15, after which the shoulder of member 31 is drawn tightly against the rear face of the adjacent slotted lug 30 by continued threading of shaft 18 into the member 15. Aperture 33 of shaft 18 is located rearwardly of collar member 31 a sufficient distance to permit the loosening of shaft 18 in the collar member to free the slotted lugs 30 from engagement with the shoulder of member 31 and also prevents the member 31 from being accidentally freed entirely of shaft 18. After shaft 18 has been tightened into member 31, sheave housing 9 is positioned on the forward face of plate 3 and is secured thereto by means of screws 7 and 10. Screws 7 extend entirely through apertures 11 of plate 3 and are threaded into a respective aperture 43 of housing member 13. Screws 10 are threaded directly into apertures 12 of plate member 3 and do not extend into housings 13. Member 40 is then secured to housing 9 by means of threaded screw 41.

When the device is assembled, the pinion gears 29 of the motors are in engagement with the gear teeth of sheave 8.

After the device has been assembled as indicated above, electric wires are run from each of the motors into the respective junction boxes 37 and are then extended between the motors through conduit and fittings 38.

*Operation*

In operation, one of the devices is used on each side of each hatchway door to be operated and with the flexible connecting members of the door sections being run over the respective sheaves 8. The motors of the devices for each door are electrically connected through a controller carried by the elevator car and are connected with a relay operated by the door in its opening and closing movements. It is to be pointed out that the speed of one of the motors of each pair is of substantially twice the speed of the other motor of the pair. The high speed motor has a high starting torque while the slow speed motor has substantially one half the torque as the high speed motor.

The controller mechanism is so arranged that in the starting operation the high speed motor is energized and gives the door a fast start. The high speed motor continues to operate until the door has reached the proper distance of travel at which time a selector limit, which is actuated through the travel of the door, is established, setting up a relay for cutting out the high speed motor and energizing the low speed motor. As the high speed motor is de-energized and the slow speed motor energized, the slow speed motor immediately acts as a drag on the momentum of the door travel and thereby prevents the momentum of the door to carry through which would cause the door to slam and rebound at the end of its travel. A final limit is established through the action of the door permitting the slow speed motor to be de-energized at a position approximately the end of the door travel which permits the door to complete its travel at such slow speed as to eliminate slamming or rebounding of the door. Both the opening and closing movements of the doors are controlled in similar manner. The door is initially operated through the high speed motor, with the travel thereof being transferred through the slow speed motor at a predetermined position in the travel, and with the slow speed motor being de-energized at a point just before the end of the travel of the door.

Referring to Figure 12, the control panel consists of an open direction relay O with its contacts O1, O2, O3 and O4, close direction relay C with its contacts C1, C2, C3 and C4, and a transfer relay TR with its contacts TR1, TR2, TR3 and TR4. The open and close direction relays are mechanically interlocked to prevent both relays from becoming energized at the same time, and likewise electrically interlocked through their contacts O4 and C4.

The operation is as follows: By pressing open direction push button OB and contact C4 and O become energized. Contacts O1, O2, and O3 close and contact O4 opens. Contact O4 being open, close direction relay C cannot become energized. Door open slow down limit OSL on the door rail and contact O3 being closed, transfer relay TR becomes energized. Contacts TR1 and TR4 open and contacts TR2 and TR3 close. L3 phase of the high speed motor is direct. Contacts O1 and TR2 being made, L1 phase of the high speed motor is established. Contacts O2 and TR3 being made L2 phase of the high speed motor is established. High speed motor HSM being energized, moves door in high speed in opening direction until open slow down limit OSL on door rail is actuated. Transfer relay contacts TR1 and TR4 being open, slow speed door motor SSM cannot operate. When door actuates slow speed limit, contact OSL opens. Contact OSL being open, transfer relay TR becomes de-energized. Contacts TR1 and TR4 close and contacts TR2 and TR3 open. Contacts TR2 and TR3 being open, phase L1 and L2 of high speed motor HSM open, de-energizing motor. Phase L3 of slow speed motor SSM is direct. Contacts O1 and TR4 being made, L1 phase of slow speed motor SSM is established. Contacts O2 and TR1 being made, phase L2 of slow speed motor SSM is established. Motor SSM being energized, moves door in slow speed toward door open final limit OL on door rail at end of travel. When door actuates open final limit switch, contact OL opens. Contact OL being open, open direction relay O becomes de-energized. Contacts O1 and O2 being open, phase L1 and L2 to slow speed motor open, de-energizing slow speed motor, bringing door to rest in fully open position. Contact O4 being closed, permits close direction relay C to energize when close door push button is pressed.

The closing direction operation is as follows: By pressing close direction push button CB and contact O4 and close limit switch contact CL being closed, close direction relay C becomes energized. Contacts C1, C2 and C3 close and contact C4 opens. Contact C4 being open, open direction relay O cannot become energized. Door close slow down limit CSL on door rail and contact C3 being closed, transfer relay TR becomes energized. Contacts TR1 and TR4 open and contacts TR2 and TR3 close. L3 phase of high speed motor HSM is direct. Contacts C1 and TR3 being made, L1 phase of high speed motor is established. Contacts C2 and TR2 being made, phase L2 of high speed motor is established. Motor HSM being energized, moves door in high speed in closing direction until close slow down limit CSL on door rail is actuated. Transfer relay contacts TR1 and TR4 being open, slow speed motor SSM cannot operate. When door actuates slow down limit switch, contact CSL opens. Contact CSL being open, transfer relay TR becomes de-energized. Contacts TR1 and TR4 close and contacts TR2 and TR3 open. Contacts TR2 and TR3 being open, phase L1 and L2 of high speed motor HSM open, de-energizing motor. Phase L3 of slow speed motor SSM is direct. Contacts C1 and TR1 being made, phase L1 of slow speed motor is established. Contacts C2 and TR4 being made, phase L2 of slow speed motor is established. Motor SSM being energized, moves door in slow speed toward door close final limit CL on door rail at end of travel. When door actuates final close limit switch, contact CL opens. Contact CL being open, close direction relay C becomes de-energized. Contacts C1, C2 and C3 open and contact C4 closes. Contacts C1 and C2 being open, phase L1 and L2, to slow speed motor, open, de-energizing slow speed motor, bringing the door to rest in fully closed position. Contact C4 being closed, permits open direction relay O to energize when door open push button is pressed.

In order that either of the motors of a pair may be readily removed from the mounting plate without the necessity of removing the other motor or the plate, we have provided the collar member 31 with the bearing support shaft 18 being threaded thereinto. When it is necessary to remove one of the motors for repair or replacement, bearing support shaft 18 is loosened with relation to collar 31 by means of a suitable wrench from the shaft side of the device. Lugs 32 of collar 31, being in register with slots 24 of bearing support 15 prevents turning of the collar with the loosening of shaft 18 therein. Cotter 34, extending through the end portion of shaft 18, prevents undue loosening of the threaded members but is positioned so as to permit the respective slotted lugs 30 of the motor to be freely removed from engagement with the shoulder of collar 31. After the collar 31 has been loosened to permit the lug 30 to be removed, the respective bolts or screws 6 and 7 are removed, permitting the motor to be removed from its position on plate 3 without disturbing the setting or security of the other motor. A replacement motor may also be installed without adjustment of the other motor.

It will be noted that, due to the arrangement of the plate 3, together with the other appurtenances, the devices are not handed as to right and left but are adapted to be used on either of the door guide members.

It is to be noted that although the preferred means of construction is shown and described, it is to be understood that minor changes may be made in the several parts thereof without materially changing the operation thereof insofar as the changes therein may fall within the scope of the appended claims.

What we claim, and desire to secure by Letters Patent of the United States, is:

1. A dual drive safety traction sheave comprised of a mounting plate, a geared sheave mounted on said plate, a pair of motors mounted on said plate with each of the motors being constantly geared to the geared sheave, with each of the motors being of different speed, with means provided on each of the motors engaging the geared sheave, and with the rotation of either of the motors driving the geared sheave and the other motor.

2. A dual drive sheave comprising a unit consisting of a mounting plate having a geared sheave secured thereon, driving means secured on the mounting plate and imparting two distinct speeds of rotation to the geared sheave, with said driving means being composed of a pair of electric motors each being geared to the geared sheave, and with the rotation of either of the motors driving the geared sheave and the other motor.

3. A dual drive sheave device comprising a sheave rotatably secured on a plate with said sheave being provided with gear teeth, a pair of electric motors removably secured on the same plate as the geared sheave and with each of the motors having a drive pinion in constant engagement with the geared sheave with the electric motors being of different speeds, with each of the motors imparting a different speed of rotation to the geared sheave, with the slower speed motor being energized upon the de-energization of the higher speed motor, and with the slower rotation of the slower speed motor providing a reduction in the momentum of the sheave and providing a braking effect thereto.

4. In a dual drive sheave device, the combination of a mounting plate, a geared sheave mounted thereon, a pair of electric motors removably secured on the mounting plate, a pinion formed on a projecting end of each motor shaft with the two pinions being in constant mesh with the geared sheave, with the motors being of different speeds, with the energization of the slower speed motor imparting a slower speed of rotation and a braking action of the geared sheave after the higher speed motor has been de-energized.

5. In a dual drive sheave device, the combination of a geared sheave and a pair of electric motors mounted on a common plate, a pinion formed on an extended portion of each motor shaft with the two pinions being in constant mesh with the geared sheave, with one of the motors being of high speed when energized and imparting high speed rotation of the geared sheave, with the second motor being of comparative slow speed when energized and imparting a comparatively slower speed to the geared sheave, with means being provided in the electrical circuits of the motors energizing the high speed motor before the slow speed motor and with the de-energizing of the high speed motor causing the slow speed motor to be energized and with the energizing of the slow speed motor providing a reduction in the momentum of the geared sheave and imparting a braking action thereto.

6. In combination with a counterbalanced freight elevator door, a two-speed door operating device being in driving connection with the door, with said device providing a high speed operation to the door through a portion of its travel and low speed operation thereto during the remainder of its travel, and with the change in speed from high speed operation to low speed operation providing a reduction in the operating speed of the door travel and providing a braking effect thereto.

7. In a dual drive sheave device, a pair of electric motors secured to a common mounting plate by means of a plurality of individual securing screws with each of the motor housings being provided with an open end lug and with the open end lug of one motor being in register with and overlapping the open end lug of the second motor, a geared sheave rotatably mounted on the mounting plate with the center of the sheave being in registered relation with the overlapping open end lugs of the motors, a bearing support located within the sheave, a sheave supporting shaft extending through the bearing support, the mounting plate, and the overlapping open end lugs of the motors, an internally-threaded collar fitting into the open end lugs and extending therethrough with a flange being formed thereon engaging the open end lug farthest removed from the mounting plate, with the sheave support shaft being threaded through the collar member, and with means formed on the collar and within the bearing support member preventing turning of the collar with relation to the bearing support member during the threading action of the sheave supporting shaft into the collar member.

PAUL R. DOEG.
ARTHUR W. CROKER.

References Cited in the file of this patent

UNITED STATES PATENTS

| Number | Name | Date |
|---|---|---|
| 774,018 | Wust-Kunz | Nov. 9, 1904 |
| 840,721 | Strobel et al. | Jan. 8, 1907 |
| 989,462 | White | Apr. 11, 1911 |
| 1,022,908 | Whitting | Apr. 9, 1912 |
| 2,356,590 | Jacobsen | Aug. 22, 1944 |
| 2,463,349 | Baner | Mar. 1, 1949 |